United States Patent
Namuduri et al.

(10) Patent No.: US 11,840,153 B1
(45) Date of Patent: Dec. 12, 2023

(54) HIGH VOLTAGE SWITCHING FOR CHARGING AN ELECTRIC VEHICLE

(71) Applicant: GM Global Technology Operations LLC, Detroit, MI (US)

(72) Inventors: Chandra S. Namuduri, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/867,246

(22) Filed: Jul. 18, 2022

(51) Int. Cl.
*B60L 53/22* (2019.01)
*B60L 53/62* (2019.01)
*B60L 53/24* (2019.01)

(52) U.S. Cl.
CPC .............. *B60L 53/62* (2019.02); *B60L 53/24* (2019.02)

(58) Field of Classification Search
CPC ....................................................... B60L 53/62
See application file for complete search history.

(56) References Cited

U.S. PATENT DOCUMENTS

| | | | |
|---|---|---|---|
| 2015/0202967 A1* | 7/2015 | Syed | B60L 50/40 320/166 |
| 2019/0100113 A1* | 4/2019 | Iwata | B60L 15/2045 |
| 2019/0218964 A1* | 7/2019 | Matthews | F01N 5/04 |
| 2021/0328444 A1* | 10/2021 | Lee | B60L 53/122 |
| 2022/0285971 A1* | 9/2022 | Gannamaneni | B60L 53/57 |
| 2022/0297557 A1* | 9/2022 | Prasad | H02M 3/1586 |
| 2022/0402390 A1* | 12/2022 | Smolenaers | H02J 3/322 |

\* cited by examiner

*Primary Examiner* — Jared Fureman
*Assistant Examiner* — Esayas G Yeshaw
(74) *Attorney, Agent, or Firm* — CANTOR COLBURN LLP

(57) ABSTRACT

Examples described herein provide a method that includes determining whether a charging station for charging a battery of a vehicle is operating in a first high voltage mode or a second high voltage mode. The method further includes, responsive to determining that the charging station is operating in the first high voltage mode: enabling an electric motor and a traction power inverter of the vehicle to operate as a boost converter to boost an accessory bus voltage of the vehicle while charging in the first high voltage mode, and charging the battery of the vehicle by supplying electric power, at a first high voltage, from the charging station to the battery.

20 Claims, 10 Drawing Sheets

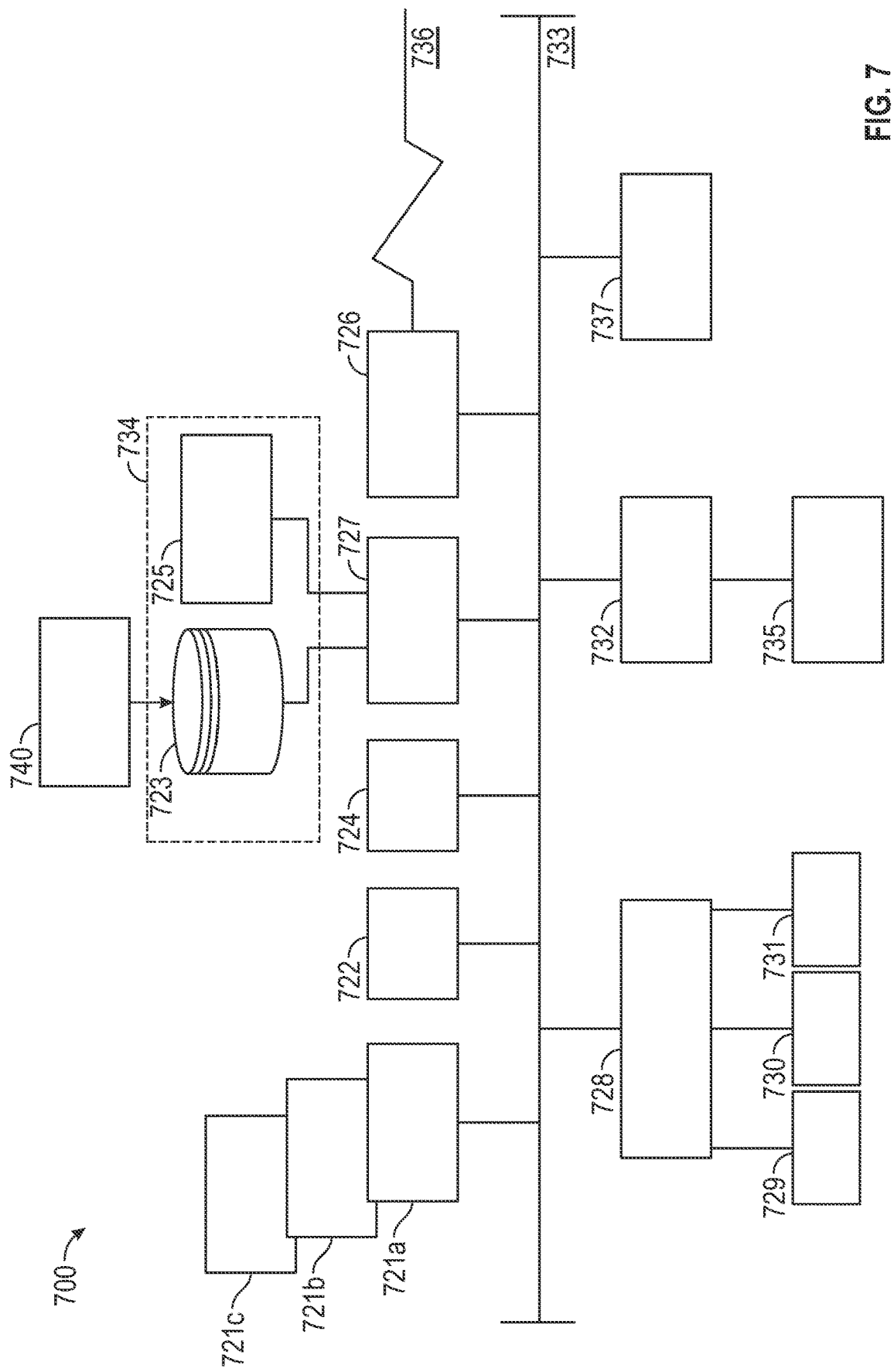

HIGH VOLTAGE SWITCHING FOR CHARGING AN ELECTRIC VEHICLE

INTRODUCTION

The present disclosure relates to vehicles and particularly to high voltage switching for charging an electric vehicle.

Modern vehicles (e.g., a car, a motorcycle, a boat, or any other type of automobile) may be equipped with one or more electric motors, such as to drive a wheel(s) of the vehicle. For example, an electric motor can be mechanically coupled to a wheel of a vehicle to apply rotational force to the wheel, creating a driveline. In some examples, a vehicle can include multiple electric motors. The electric motor(s) receives electric power from a rechargeable energy storage system (RESS), which can include one or more batteries for storing electric power. The batteries can be recharged, for example, using a charging station. The RESS can also provide electric power to other systems of the vehicle (e.g., climate control systems, infotainment systems, etc.).

SUMMARY

In one exemplary embodiment, a method is provided. The method includes determining whether a charging station for charging a battery of a vehicle is operating in a first high voltage mode or a second high voltage mode. The method further includes, responsive to determining that the charging station is operating in the first high voltage mode: enabling an electric motor and a traction power inverter of the vehicle to operate as a boost converter to boost an accessory bus voltage of the vehicle while charging in the first high voltage mode, and charging the battery of the vehicle by supplying electric power, at a first high voltage, from the charging station to the battery.

In addition to one or more of the features described herein, or as an alternative, further embodiments of the method may include, responsive to determining that the charging station is operating in the second high voltage mode: disabling the electric motor and the traction power inverter of the vehicle to prevent the boost while charging in the second high voltage mode; and charging the battery of the vehicle by supplying electric power, at a second high voltage, from the charging station to the battery.

In addition to one or more of the features described herein, or as an alternative, further embodiments of the method may include that the first high voltage is substantially 400 volts and wherein the second high voltage is substantially 800 volts.

In addition to one or more of the features described herein, or as an alternative, further embodiments of the method may include that the accessory bus voltage is boosted to substantially double the first high voltage.

In addition to one or more of the features described herein, or as an alternative, further embodiments of the method may include that the accessory bus voltage is substantially 800 volts and wherein the first high voltage is substantially 400 volts.

In addition to one or more of the features described herein, or as an alternative, further embodiments of the method may include that a switching frequency for the traction power inverter is set to avoid resonant frequencies of an input of an accessory of the vehicle and of an input of the traction power inverter.

In addition to one or more of the features described herein, or as an alternative, further embodiments of the method may include controlling a pulse width modulation frequency and a duty cycle of the traction power inverter to minimize losses in the electric motor of the vehicle while providing the accessory bus voltage.

In addition to one or more of the features described herein, or as an alternative, further embodiments of the method may include that enabling the electric motor and the traction power inverter of the vehicle to operate as the boost converter includes controlling a set of switches to cause electric power to flow through the electric motor and the traction power inverter before flowing into an accessory of the vehicle.

In addition to one or more of the features described herein, or as an alternative, further embodiments of the method may include that disabling the electric motor and the traction power inverter of the vehicle to prevent the boost includes controlling a set of switches to cause electric power to flow through an accessory of the vehicle before flowing into the traction power inverter and the electric motor.

In another exemplary embodiment a vehicle is provided. The vehicle includes a traction power inverter, an electric motor, and a controller. The controller determines whether a charging station for charging a battery of a vehicle is operating in a first high voltage mode or a second high voltage mode. The controller further, responsive to determining that the charging station is operating in the first high voltage mode: enables an electric motor and a traction power inverter of the vehicle to operate as a boost converter to boost an accessory bus voltage of the vehicle while charging in the first high voltage mode; and charges the battery of the vehicle by supplying electric power, at a first high voltage, from the charging station to the battery.

In addition to one or more of the features described herein, or as an alternative, further embodiments of the vehicle may include that the controller is further to, responsive to determining that the charging station is operating in the second high voltage mode: disable the electric motor and the traction power inverter of the vehicle to prevent the boost while charging in the second high voltage mode; and charge the battery of the vehicle by supplying electric power, at a second high voltage, from the charging station to the battery.

In addition to one or more of the features described herein, or as an alternative, further embodiments of the vehicle may include that the first high voltage is substantially 400 volts and wherein the second high voltage is substantially 800 volts.

In addition to one or more of the features described herein, or as an alternative, further embodiments of the vehicle may include that the accessory bus voltage is boosted to substantially double the first high voltage.

In addition to one or more of the features described herein, or as an alternative, further embodiments of the vehicle may include that the accessory bus voltage is substantially 800 volts and wherein the first high voltage is substantially 400 volts.

In addition to one or more of the features described herein, or as an alternative, further embodiments of the vehicle may include that a switching frequency for the traction power inverter is set to avoid resonant frequencies of an input of an accessory of the vehicle and of an input of the traction power inverter.

In addition to one or more of the features described herein, or as an alternative, further embodiments of the vehicle may include that the controller is further to control a pulse width modulation frequency and a duty cycle of the traction power inverter to minimize losses in the electric motor of the vehicle while providing the accessory bus voltage.

In addition to one or more of the features described herein, or as an alternative, further embodiments of the vehicle may include that enabling the electric motor and the traction power inverter of the vehicle to operate as the boost converter includes controlling a set of switches to cause electric power to flow through the electric motor and the traction power inverter before flowing into an accessory of the vehicle.

In addition to one or more of the features described herein, or as an alternative, further embodiments of the vehicle may include that disabling the electric motor and the traction power inverter of the vehicle to prevent the boost includes controlling a set of switches to cause electric power to flow through an accessory of the vehicle before flowing into the traction power inverter and the electric motor.

In another exemplary embodiment a system is provided. The system includes a memory including computer readable instructions. The system further includes processing device for executing the computer readable instructions, the computer readable instructions controlling the processing device to perform operations. The operations include determining whether a charging station for charging a battery of a vehicle is operating in a first high voltage mode or a second high voltage mode. The operations further include responsive to determining that the charging station is operating in the first high voltage mode: enabling an electric motor and a traction power inverter of the vehicle to operate as a boost converter to boost an accessory bus voltage of the vehicle while charging in the first high voltage mode; and charging the battery of the vehicle by supplying electric power, at a first high voltage, from the charging station to the battery.

In addition to one or more of the features described herein, or as an alternative, further embodiments of the vehicle may include that the instructions further cause the processing device to perform operations including, responsive to determining that the charging station is operating in the second high voltage mode: disabling the electric motor and the traction power inverter of the vehicle to prevent the boost while charging in the second high voltage mode; and charging the battery of the vehicle by supplying electric power, at a second high voltage, from the charging station to the battery.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 7 is a block diagram of a processing system for implementing the techniques described herein according to an exemplary embodiment.

DETAILED DESCRIPTION

Figure 1:
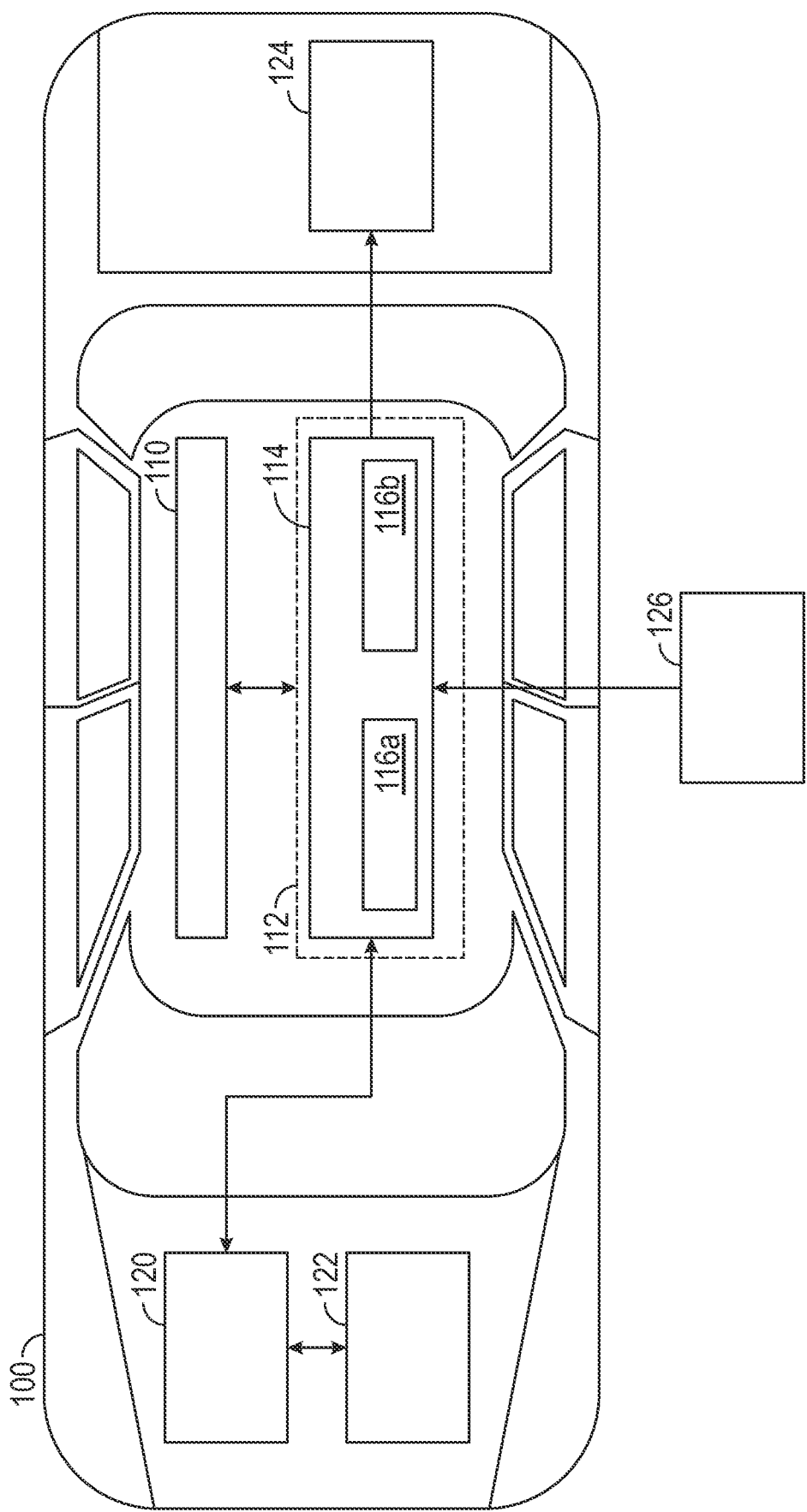
FIG. 1 is a block diagram of a vehicle that incorporates high voltage switching for charging the vehicle according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for high voltage switching for charging an electric vehicle. Electric vehicles can operate at different high voltages. For example, some electric vehicles operate at substantially 400 volts while other electric vehicles operate at substantially 800 volts. Some vehicles use fixed high voltage, such as to provide electric power to an electric motor and/or auxiliary devices. However, other vehicles use variable high voltages to provide electric power to the electric motor. An electric vehicle stores electric power for operating one or more electric motors in one or more batteries, which can be recharged at recharging stations. Recharging stations may operate at different voltage levels. For example, recharging stations may operate at 150 volts, 400 volts, 800 volts, and/or the like, including combinations and/or multiples thereof.

One or more embodiments described herein provide architectures and methods for providing high voltage switching for charging an electric vehicle. Particularly, one or more embodiments described herein, provide architectures and methods for supporting relatively higher high voltage accessories (e.g., substantially 800 volts) in a native higher high voltage bus (e.g., substantially 800 volts) electric vehicle while charging a switchable higher high voltage (e.g., substantially 800 volts) battery from a relatively lower high voltage (e.g., substantially 400 volts) charging station without derating the power of the accessories and without using a direct current-to-direct current (DC-DC) converter.

FIG. 1 is a block diagram of a vehicle 100 that incorporates high voltage switching for charging the vehicle 100 according to one or more embodiments described herein. The vehicle 100 may be a car, truck, van, bus, motorcycle, boat, plane, or another suitable vehicle. In the example of FIG. 1, the vehicle 100 includes a controller 110 to control a circuit 112 that includes a rechargeable energy storage system (RESS) 114. The vehicle 100 further includes an electric motor 120 coupled to a driveline 122 and an auxiliary device 124. The auxiliary device 124 can include one or more devices, other than the electric motor 120, that receive electric power. Examples of auxiliary devices, such as the auxiliary device 124, include but are not limited to a climate control system such as a heater and/or air conditioning system, integrated power equipment, and/or the like, including combinations and/or multiples thereof.

The RESS 114 provides electric power to the electric motor 120 and the auxiliary device 124. As an example, the RESS 114 includes one or more batteries (B1, B2) 116a, 116b to receive, store, and supply electric power. The controller 110 controls aspects of the circuit 112 (e.g., one or more relays (also referred to as "switches")) to selectively provide electric power to one or more batteries 116a, 116b of the RESS 114 from a charging station 126 where voltage of the electric power from the charging station 126 can vary.

That is, in some cases, the charging station 126 can supply electric power to the RESS 114 (including one or more batteries therein) at different changing voltages. It may be desirable to maintain a substantially constant voltage supply to the auxiliary device 124, for example, regardless of the charging voltage supplied by the charging station 126. This provides backward compatibility for a 800 volt native drive system to be charged from 400 volt DC fast chargers, for example. Some conventional approaches to this problem implement an 800/400 volt switchable pack. However, such a solution uses a costly and complicated 400 volt to 800 volt direct current-to-direct current (DC-DC) boost converter to support 800 volt accessories (e.g., the auxiliary device 124) during 400 volt DC fast charging. Another solution is to use derated operation at 400 volts. However, these approaches are undesirable due to their increased cost, complexity, and inefficiency.

One or more embodiments described herein addresses these and other shortcomings by providing for techniques for high voltage switching for charging an electric vehicle where an electric motor and a traction power inverter of a vehicle can be enabled to operate as a boost converter to boost an accessory bus voltage of the vehicle while charging at a voltage below a normal operating voltage of the accessory bus voltage. For example, where the accessory bus voltage is typically 800 volts but a charging station provides less than 800 volts (e.g., 400 volts) of electric power, an electric motor (e.g., an electric motor) together with a traction power inverter can be used to boost the accessory bus voltage to the desired level. As an example, one or more embodiments described herein provide for using a multi-phase electric motor and switches in a traction power inverter (TPIM) as a multi-phase interleaved boost converter to charge the high voltage bus supplying the high voltage (e.g., 800 volt) accessories (e.g. accessory power module (APM), air conditioning electronic controller ACEC, etc.)). According to one or more embodiments, a pulse width modulation (PWM) frequency and duty cycle of the TPIM are controlled to minimize losses in the electric drive while providing the desired boosted voltage for the accessories.

Figure 2A:
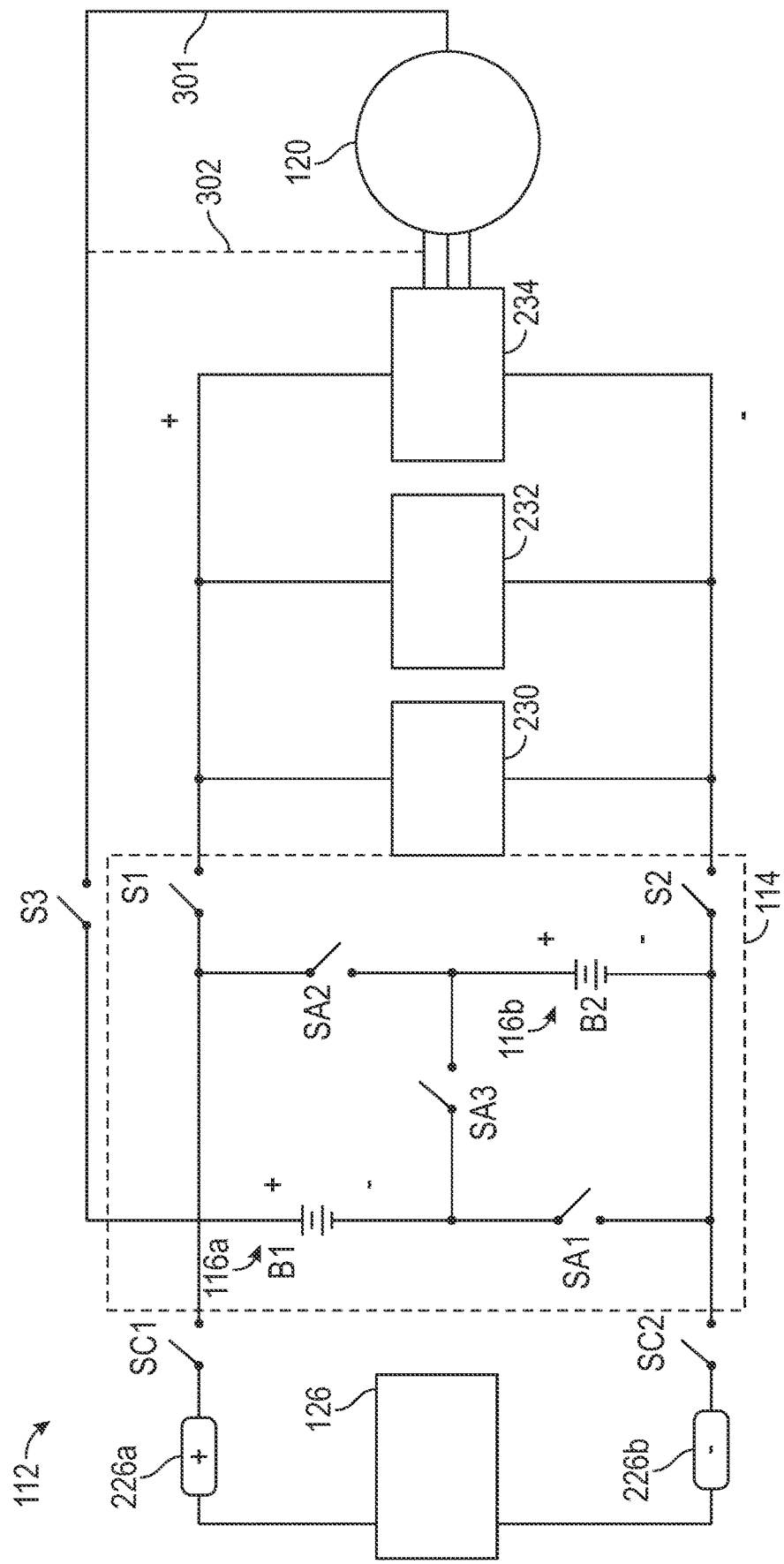
FIG. 2A is a circuit diagram of a circuit for high voltage switching for charging an electric vehicle according to one or more embodiments described herein.
Figure 2B:
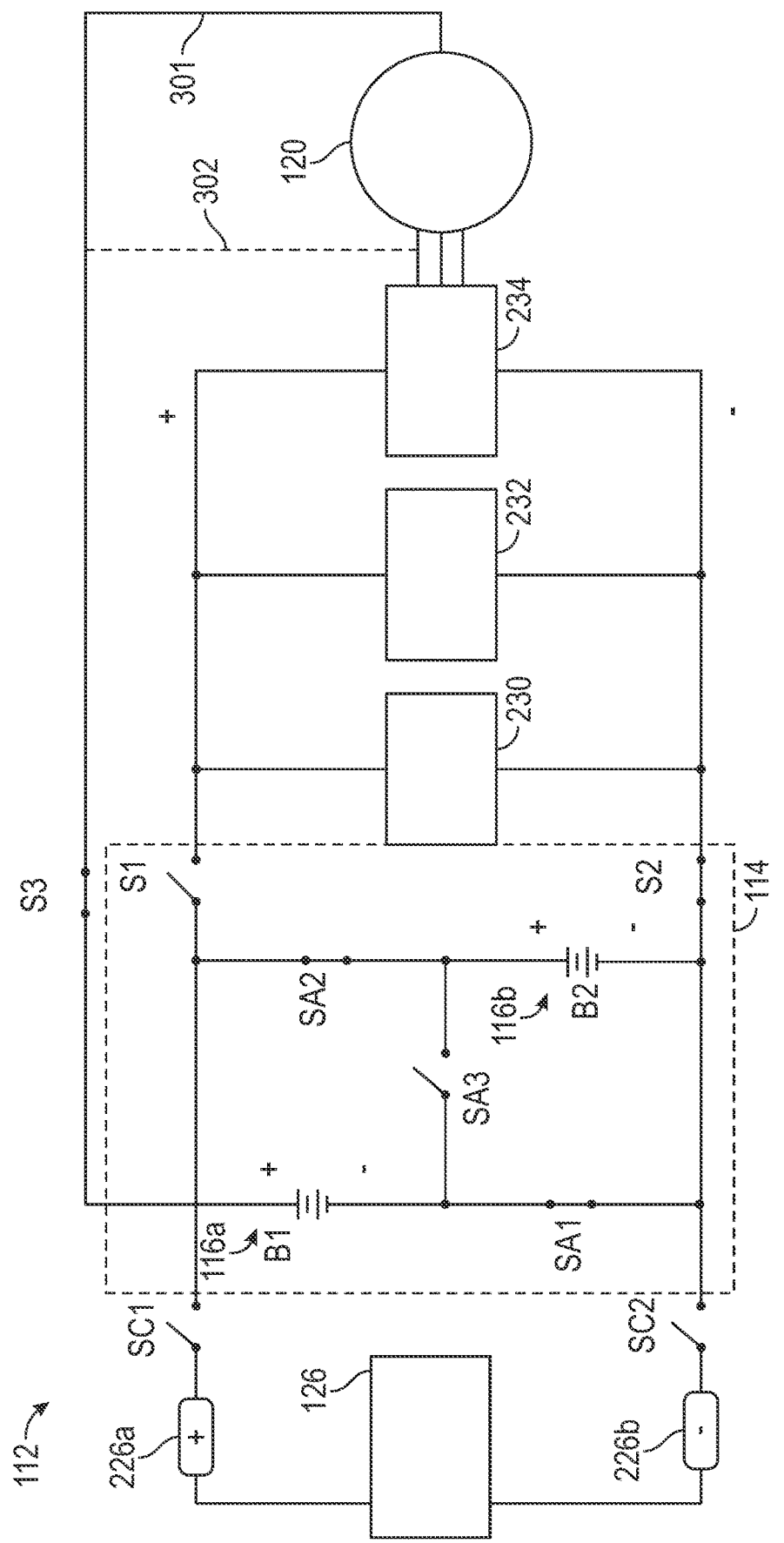
FIG. 2B is the circuit diagram of FIG. 2A showing a first configuration of switches according to one or more embodiments described herein.
Figure 2C:
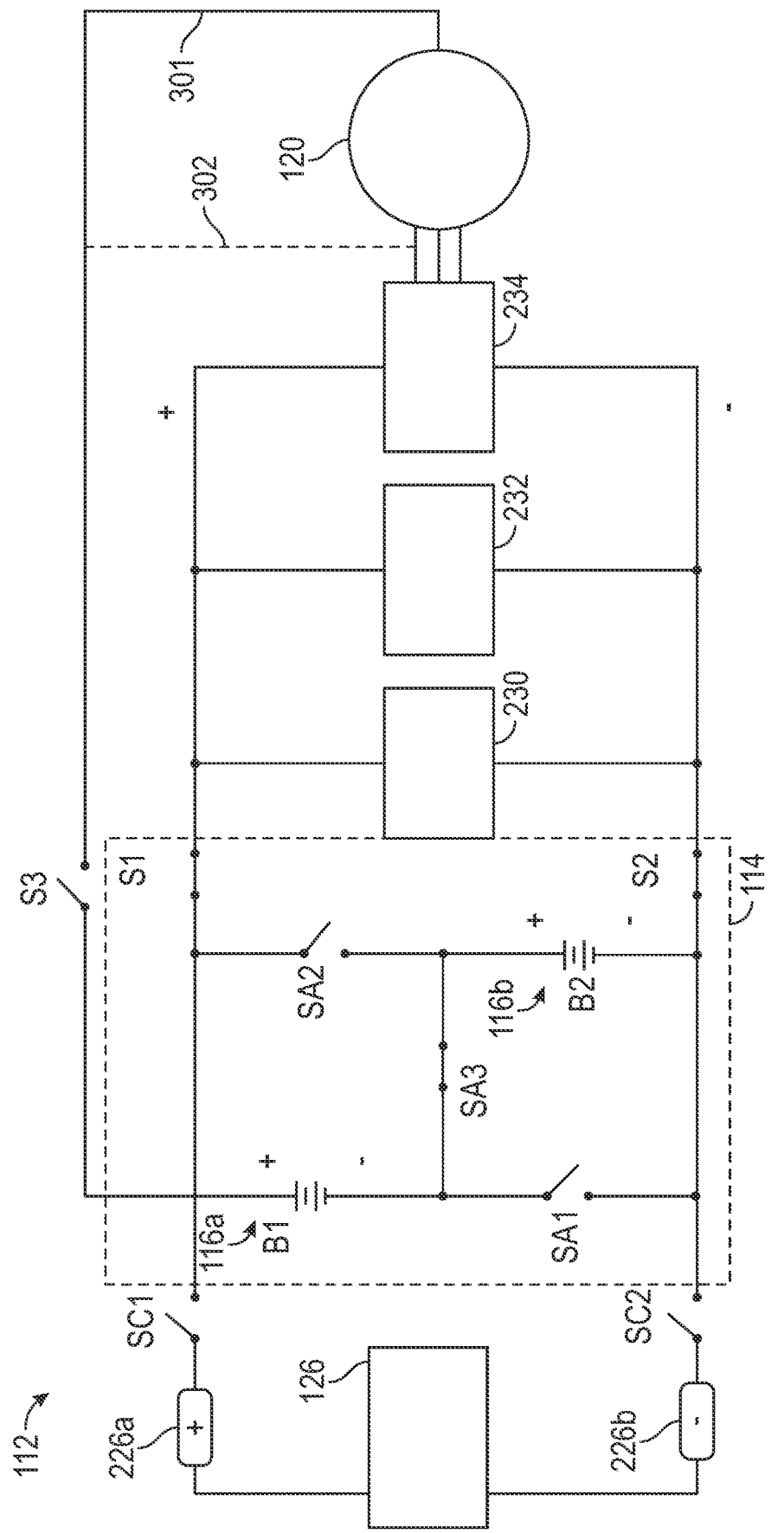
FIG. 2C is the circuit diagram of FIG. 2A showing a second configuration of switches according to one or more embodiments described herein.

FIGS. 2A-2C depict a circuit diagram of the circuit of FIG. 1 according to one or more embodiments described herein. Particularly, FIG. 2A is a circuit diagram of the circuit 112 for high voltage switching for charging an electric vehicle (e.g., the vehicle 100) according to one or more embodiments described herein. FIG. 2B is the circuit diagram of FIG. 2A showing a first configuration of switches according to one or more embodiments described herein. FIG. 2C is the circuit diagram of FIG. 2A showing a second configuration of switches according to one or more embodiments described herein. FIGS. 2A-2C are now described together.

The circuit 112 includes the RESS 114, which includes batteries (B1, B2) 116a, 116b to receive, store, and supply electric power. The RESS 114 receives electric power, for example, from the charging station 126 across a pair of terminals: positive terminal 226a and negative terminal 226b. The voltage across the pair of terminals 226a, 226b can vary depending on the output voltage of the charging station 126.

The circuit 112 also includes various switches configured and arranged as shown, including switches S1, S2, S3, SA1, SA2, SA3, SC1, and SC2. The controller 110 (see FIG. 1) can control one or more of the switches S1, S2, S3, SA1, SA2, SA3, SC1, and SC2 depending on the voltage across the pair of terminals 226a, 226b, that is the output voltage of the charging station 126, in order to maintain a substantially constant voltage supply to the auxiliary device 124. Non-limiting examples of the auxiliary device 124 are shown in FIGS. 2A-2C as APM 230 and ACEC 232.

FIG. 2B shows a first configuration of the switches S1, S2, S3, SA1, SA2, SA3, SC1, and SC2. When the charging is at a first voltage (e.g., a voltage lower than desired for the accessory voltage), the electric motor 120 and the TPIM 234 can be enabled to operate as a boost converter to boost an accessory bus voltage of the vehicle while charging at the first voltage. To do this, the controller 110 causes the switches S1 and SA3 to be open and causes the switches SA1, SA2, S2, and S3 to be closed as shown in FIG. 2B. The TPIM 234 can then be set to boost the accessory bus voltage, such as to substantially twice the charging voltage. Once charging is ready, charging can begin by closing the switches SC1 and SC2.

FIG. 2C shows a second configuration of the switches S1, S2, S3, SA1, SA2, SA3, SC1, and SC2. When the charging is at a second voltage (e.g., a voltage substantially equal to a voltage desired for the accessory voltage), the electric motor 120 and the TPIM 234 are disabled to prevent boost. To do this, the controller 110 causes the switches SA1, SA2, and S3 to be open and causes the switches SA3, S1, and S2 to be closed as shown in FIG. 2C. The TPIM 234 can then be set to disable the boost. Once charging is ready, charging can begin by closing the switches SC1 and SC2.

Figure 3:
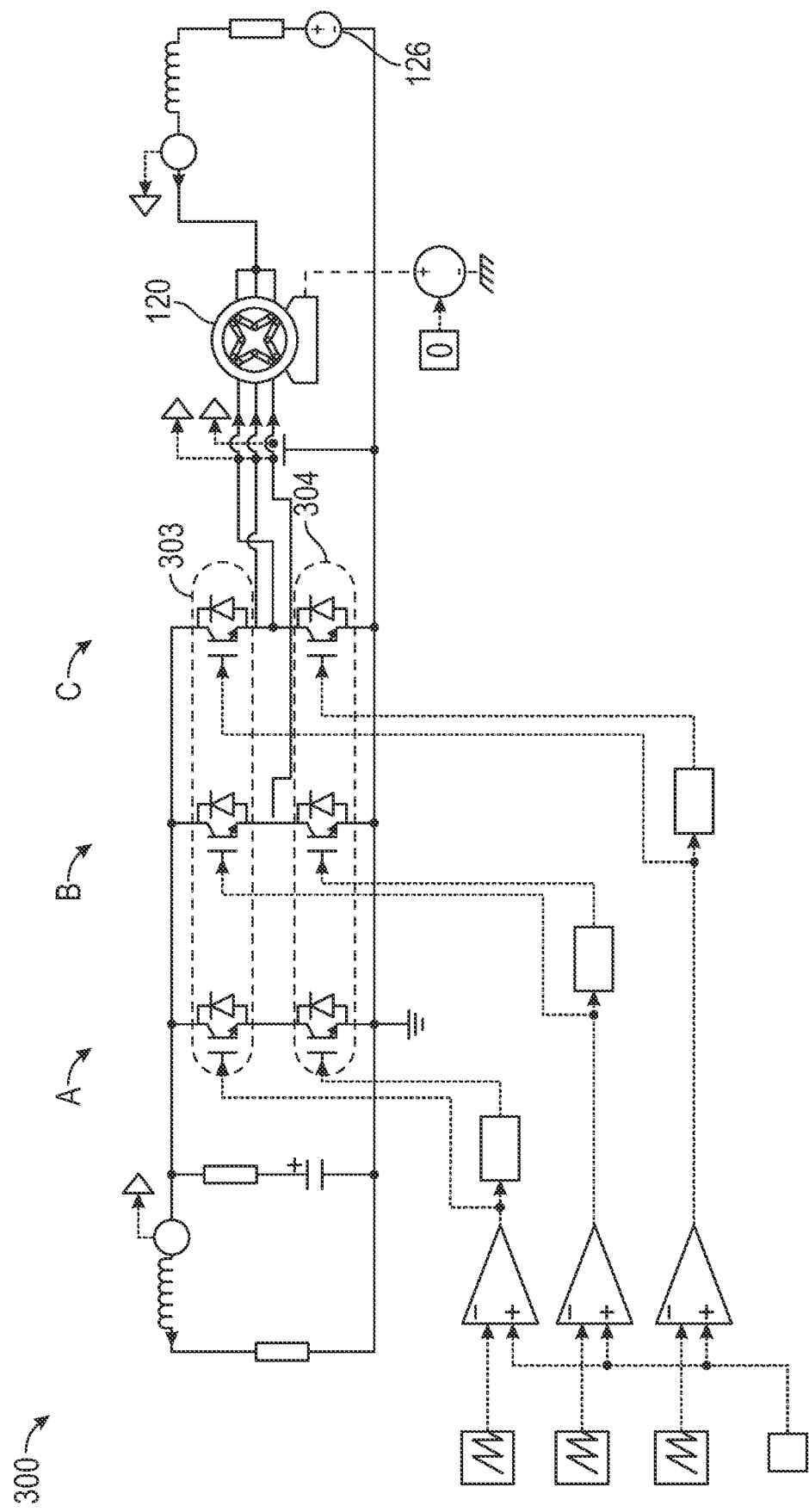
FIG. 3 is a circuit diagram of a circuit for high voltage switching for charging an electric vehicle according to one or more embodiments described herein.

FIG. 3 is a circuit diagram of a circuit 300 for high voltage switching for charging an electric vehicle according to one or more embodiments described herein. In this example, the circuit 300 includes the electric motor 120. The electric motor 120 is a three-phase electric motor having a first phase (phase A), a second phase (phase B), and a third phase (phase C). The circuit 300 also includes the charging station 126, which in this example, is delivering electric power at substantially 400 volts. When switch S3 is closed (see, e.g., FIG. 2B), power can be transmitted to the electric motor 120 via line 301 or to one of the phases of the electric motor 120 via line 302 (see, e.g., FIGS. 2A-2C). Each of the three phases of the TPIM 234 (FIG. 2B) includes upper switches 303 and lower switches 304. In this example, although the charging station 126 is delivering electric power at substantially 400 volts, the upper switches 303 deliver electric power to the auxiliary device 124 (e.g., one or more of the APM 230 and/or the ACEC 232, and/or the like, including combinations and/or multiples thereof) at substantially 800 volts due to the boost of the electric motor 120 and TPIM 234.

Figure 4A:
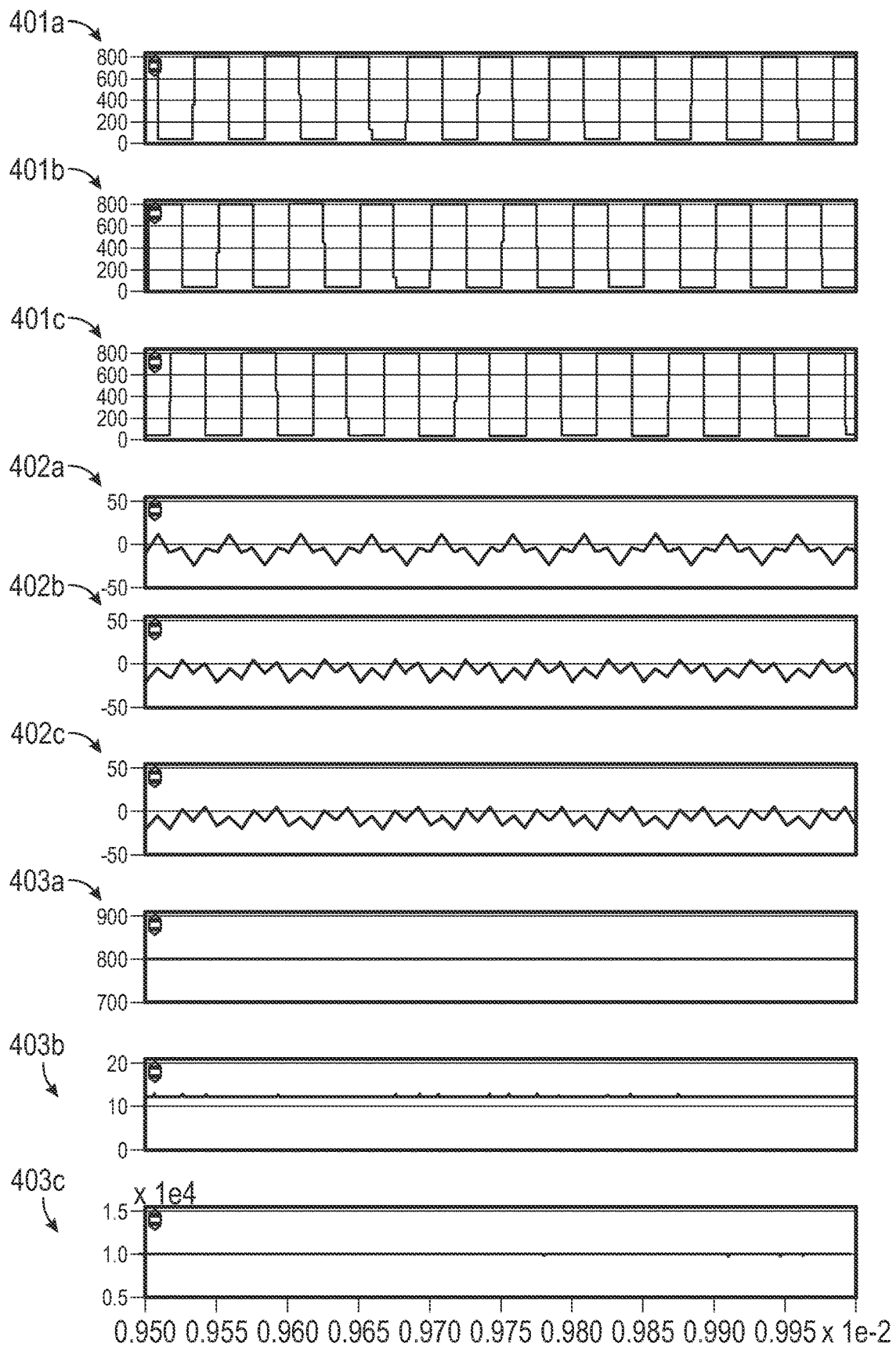
FIG. 4A are graphs for a three-phase interleave boost mode of the circuit of FIG. 3 according to one or more embodiments described herein.

FIG. 4A are graphs 401a, 401b, 401c, 402a, 402b, 402c, 403a, 403b, 403c for a three-phase interleave boost mode of the circuit of FIG. 3 according to one or more embodiments described herein. That is, when the circuit 112 is configured as shown in FIG. 2B (boost) and the charging begins after switches SC1 and SC2 are closed, the voltage, current, and load current can be measured, with the resulting graphs shown in FIG. 4A. The graphs 401*a*, 401*b*, 401*c* represent the voltage of three phases (phase A, phase B, phase C) of the electric motor 120 during boost charging with respect to the negative high voltage bus. The graphs 402*a*, 402*b*, 402*c* represent the current through the three phases of the electric motor 120 during boost charging. The graphs 403*a*, 403*b*, 403*c* represent the voltage across the load (auxiliary device 124), current through the load, and power supplied to the load during boost charging.

Figure 4B:
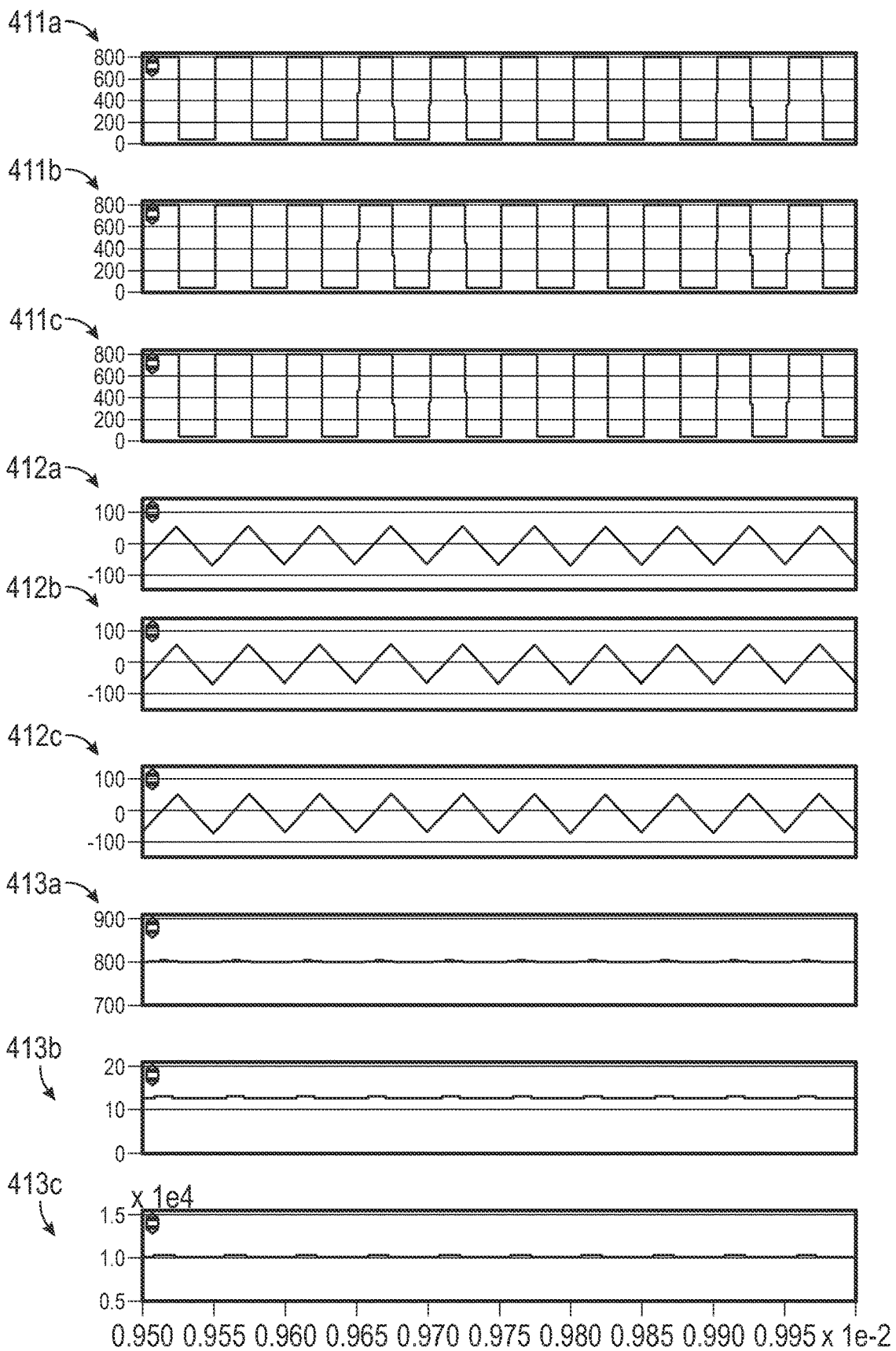
FIG. 4B are graphs for a three-phase non-interleave boost mode of the circuit of FIG. 3 according to one or more embodiments described herein.

FIG. 4B are graphs 411*a*, 411*b*, 411*c*, 412*a*, 412*b*, 412*c*, 413*a*, 413*b*, 413*c* for a three-phase non-interleave boost mode of the circuit of FIG. 3 according to one or more embodiments described herein. That is, when the circuit 112 is configured as shown in FIG. 2C (non-boost) and the charging begins after switches SC1 and SC2 are closed, the voltage, current, and load current can be measured, with the resulting graphs shown in FIG. 4B. The graphs 411*a*, 411*b*, 411*c* represent the voltage of three phases (phase A, phase B, phase C) of the electric motor 120 during non-interleaved boost charging with respect to the negative high voltage bus. The graphs 412*a*, 412*b*, 412*c* represent the current through the three phases of the electric motor 120 during non-interleaved boost charging. The graphs 413*a*, 413*b*, 413*c* represent the voltage across the load, current through the load, and power supplied to the load during non-interleaved boost charging.

Figure 5:
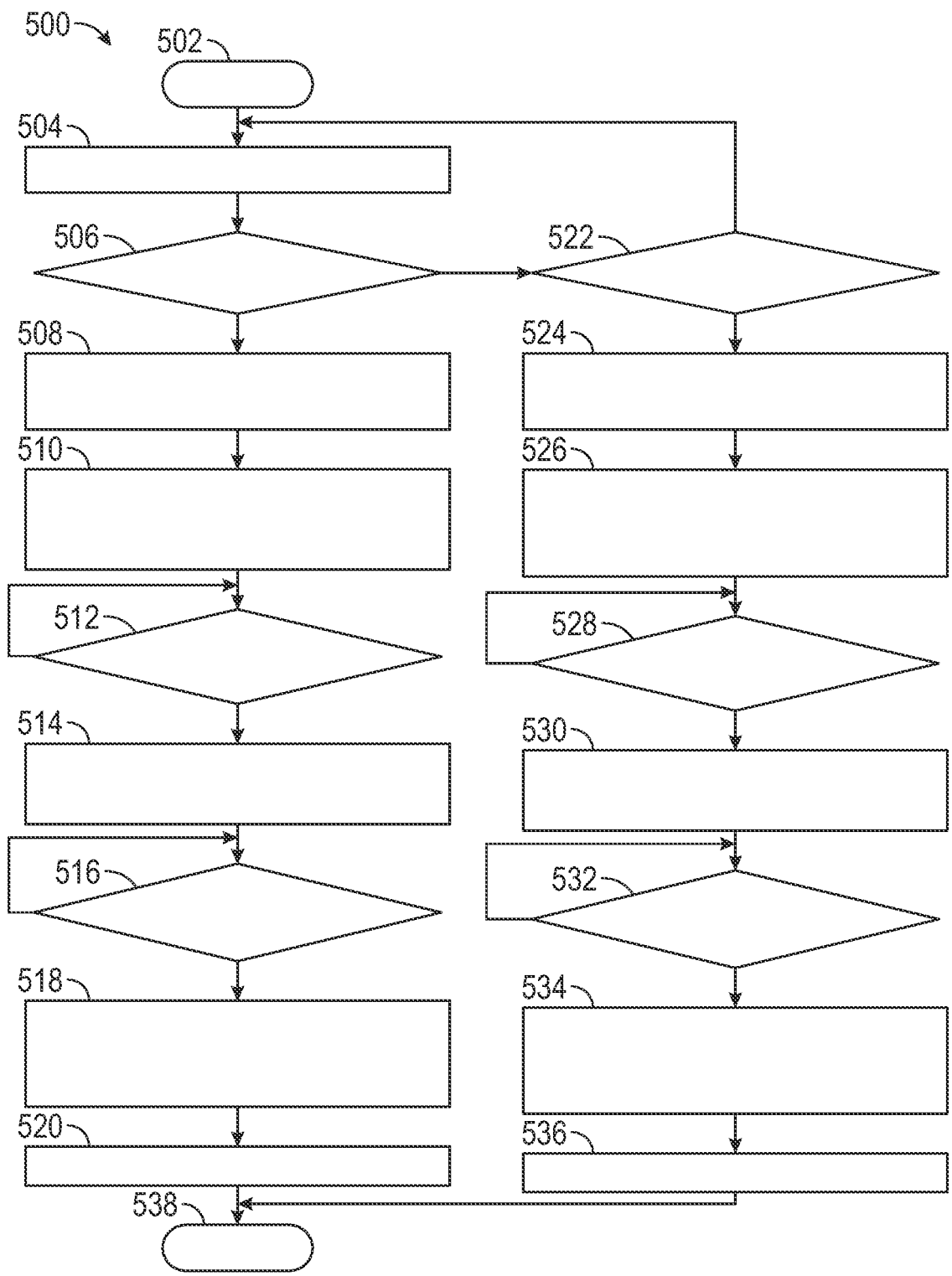
FIG. 5 is a block diagram of a method for high voltage switching for charging an electric vehicle according to one or more embodiments described herein.

FIG. 5 depicts a flow diagram of a method 500 according to one or more embodiments described herein. It should be appreciated that the method 500 can be performed by any suitable system or device such as the controller 110 of FIG. 1, the processing system 700 of FIG. 7, or any other suitable processing system and/or processing device (e.g., a processor). The method 500 is now described with reference to one or more aspects of FIGS. 1 and 2A-2C but is not so limited.

At block 502, the method 500 starts and proceeds to block 504. At block 504, the controller 110 reads or otherwise determines a type of the charging station 126 connected to the vehicle 100. At block 506, it is determined whether the charging station 126 is providing electric power for charging at a first voltage (e.g., substantially 400 volts).

If it is determined at block 506 that the charging is at the first voltage, the method 500 proceeds to block 508. At block 508, the controller 110 causes the switches S1 and SA3 to be open and causes the switches SA1, SA2, S2, and S3 to be closed (see, e.g., FIG. 2B). At block 510, the controller 110 sets a pulse width modulation (PWM) command to the TPIM 234 to boost an accessory voltage to substantially twice the battery voltage. At block 512, the controller 110 determines whether the charging station 126 is ready. Responsive to the charging station 126 being ready, at block 514, the controller 110 causes the switches SC1 and SC2 to close and sets the charging current ($I_{charge}$) and charging voltage ($V_{charge}$) to enable the charging station 126 to charge. At 516, the controller 110 determines whether a target state of charge is reached. Responsive to the target state of charge being reached, at block 518, the controller 110 sets the charging current ($I_{charge}$) to zero, commands the TPIM 234 to cease boost mode, disables the charging station 126, and causes the switches SC1 and SC2 to open. At block 520, the controller 110 causes the switches SA1, SA2, S2, and S3 to be open (see, e.g., FIG. 2A). The method 500 proceeds to block 538 and ends.

If it is determined at block 506 that the charging is not at the first voltage, the method 500 proceeds to block 522 where it is determined whether the charging station 126 is providing electric power for charging at a second voltage (e.g., substantially 800 volts). If not, the method 500 returns to block 504, and the method 500 can restart.

If it is determined at block 522 that the charging is at the second voltage, the method 500 proceeds to block 524. At block 524, the controller 110 causes the switches SA1, SA2, and S3 to be open and causes the switches SA3, S1, and S2 to be closed (see, e.g., FIG. 2C). At block 526, the controller 110 disables the TPIM 234. At block 528, the controller 110 determines whether the charging station 126 is ready. Responsive to the charging station 126 being ready, at block 530, the controller 110 causes the switches SC1 and SC2 to close and sets the charging current ($I_{charge}$) and charging voltage ($V_{charge}$) to enable the charging station 126 to charge. At 532, the controller 110 determines whether a target state of charge is reached. Responsive to the target state of charge being reached, at block 534, the controller 110 sets the charging current ($I_{charge}$) to zero, disables the charging station 126, and causes the switches SC1 and SC2 to open. At block 536, the controller 110 causes the switches S1, S2, and SA3 to be open (see, e.g., FIG. 2A). The method 500 proceeds to block 538 and ends.

Additional processes also may be included, and it should be understood that the process depicted in FIG. 5 represents an illustration and that other processes may be added or existing processes may be removed, modified, or rearranged without departing from the scope and spirit of the present disclosure.

Figure 6:
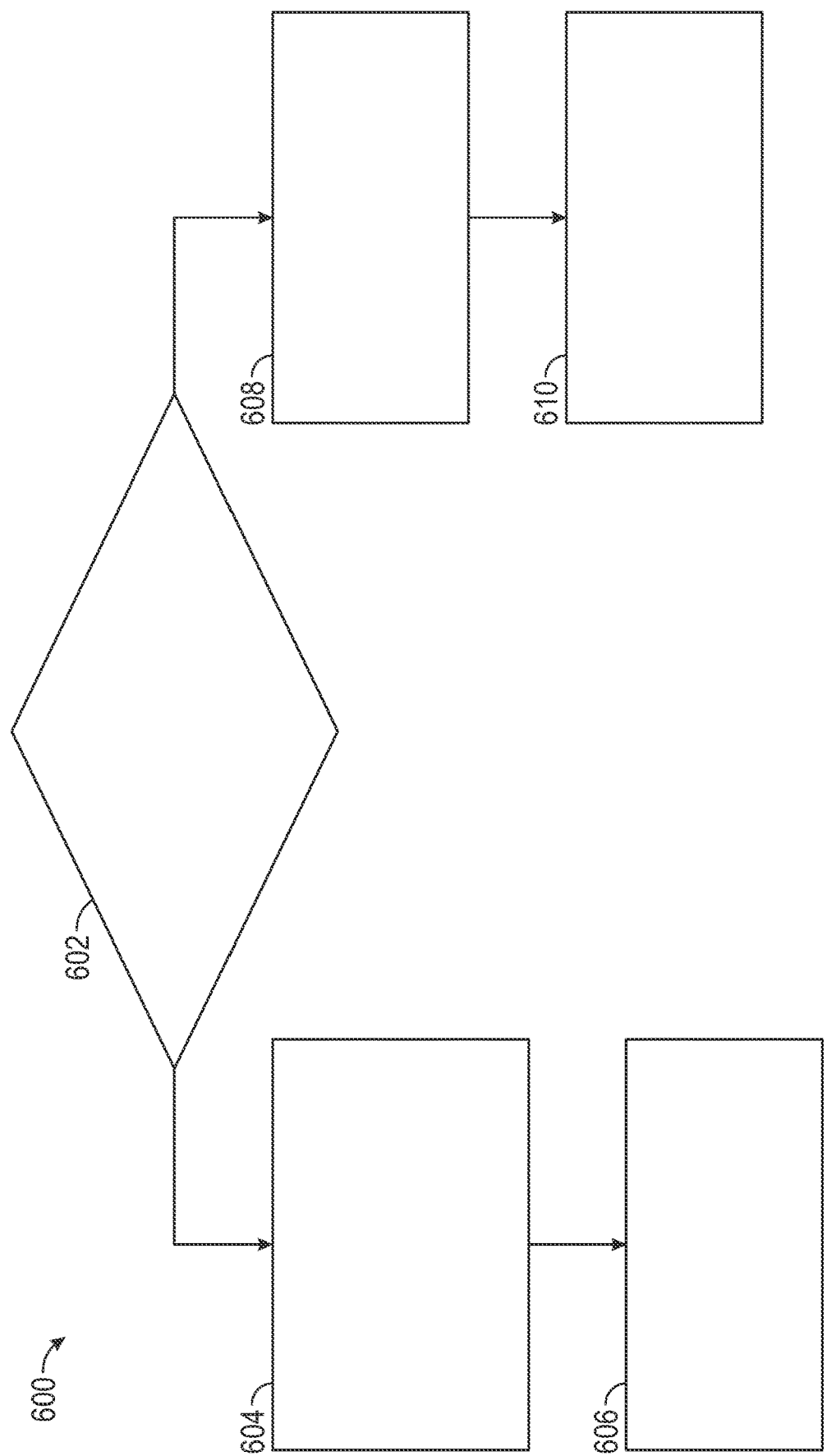
FIG. 6 is a block diagram of a method for high voltage switching for charging an electric vehicle according to one or more embodiments described herein.

FIG. 6 depicts a flow diagram of a method 600 according to one or more embodiments described herein. It should be appreciated that the method 600 can be performed by any suitable system or device such as the controller 110 of FIG. 1, the processing system 700 of FIG. 7, or any other suitable processing system and/or processing device (e.g., a processor). The method 600 is now described with reference to one or more aspects of FIGS. 1 and 2A-2C but is not so limited.

At block 602, the controller 110 determines whether the charging station 126 for charging a battery (e.g., batteries B1 116*a* and/or B2 116*b*) of the vehicle 100 is operating in a first high voltage mode or a second high voltage mode.

If it is determined at block 602 that the charging station 126 is operating in the first high voltage mode, the method 600 proceeds to block 604. At block 604, the controller 110 enables the electric motor 120 (i.e., an electric motor) and the traction power inverter 234 of the vehicle 100 to operate as a boost converter to boost an accessory bus voltage of the vehicle while charging in the first high voltage mode. At block 606, the battery (e.g., batteries B1 116*a* and/or B2 116*b*) of the vehicle 100 is charged by supplying electric power, at a first high voltage (e.g., substantially 400 volts) from the charging station to the battery. According to one or more embodiments described herein, during the charging, the accessory bus voltage is boosted to substantially double the first high voltage. For example, where the first high voltage used to charge the battery is substantially 400 volts, the traction power inverter 234 acts as a boost converter to boost the accessory bus voltage of the vehicle to substantially 800 volts.

If it is determined at block 602 that the charging station 126 is operating in the second high voltage mode, the method 600 proceeds to block 608. At block 608, the controller 110 disables the electric motor 120 (i.e., an electric motor) and the traction power inverter 234 of the vehicle 100 to prevent boost while charging in the second dhigh voltage mode. At block 610, the battery (e.g., batteries B1 116*a* and/or B2 116*b*) of the vehicle 100 is charged by supplying electric power, at a second high voltage (e.g., substantially 800 volts) from the charging station to the battery.

Additional processes also may be included, and it should be understood that the process depicted in FIG. 6 represents an illustration and that other processes may be added or existing processes may be removed, modified, or rearranged without departing from the scope and spirit of the present disclosure.

It is understood that one or more embodiments described herein is capable of being implemented in conjunction with any other type of computing environment now known or later developed. For example, FIG. 7 depicts a block diagram of a processing system 700 for implementing the techniques described herein. In examples, processing system 700 has one or more central processing units ("processors" or "processing resources") 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A method comprising:
   determining whether a charging station for charging a battery of a vehicle is operating in a first high voltage mode or a second high voltage mode; and
   responsive to determining that the charging station is operating in the first high voltage mode:
   enabling an electric motor and a traction power inverter of the vehicle to operate as a boost converter to boost an accessory bus voltage of the vehicle while charging in the first high voltage mode; and
   charging the battery of the vehicle by supplying electric power, at a first high voltage, from the charging station to the battery; and
   wherein the vehicle includes a traction power inverter;
   an electric motor a first switch (SC1) configured to connect a first terminal of a charging station to a positive bus of a rechargeable energy storage system;
   a second switch (SC2) configured to connected a second terminal of the charging station to a negative bus of the rechargeable energy storage system;
   a third switch (S1) connecting the positive bus of the rechargeable energy storage system to a positive distribution bus;
   a fourth switch (S2) connecting the negative bus of the rechargeable energy storage system to a negative distribution bus;
   a fifth switch (S3) connecting the positive rechargeable energy storage system bus to one of the electric motor and a single phase of the electric motor such that when the first switch and the fifth switch are closed power is delivered directly from the charging station to the one of the electric motor and the single phase of the electric motor through the first switch and the fifth switch.

2. The method of claim 1, further comprising, responsive to determining that the charging station is operating in the second high voltage mode:
   disabling the electric motor and the traction power inverter of the vehicle to prevent the boost while charging in the second high voltage mode; and
   charging the battery of the vehicle by supplying electric power, at a second high voltage, from the charging station to the battery.

3. The method of claim 2, wherein the first high voltage is substantially 400 volts and wherein the second high voltage is substantially 800 volts.

4. The method of claim 2, wherein the accessory bus voltage is substantially 800 volts and wherein the first high voltage is substantially 400 volts.

5. The method of claim 2, wherein disabling the electric motor and the traction power inverter of the vehicle to prevent the boost comprises controlling a set of switches to cause electric power to flow through an accessory of the vehicle before flowing into the traction power inverter and the electric motor.

6. The method of claim 1, wherein the accessory bus voltage is boosted to substantially double the first high voltage.

7. The method of claim 1, wherein a switching frequency for the traction power inverter is set to avoid resonant frequencies of an input of an accessory of the vehicle and of an input of the traction power inverter.

8. The method of claim 1, further comprising controlling a pulse width modulation frequency and a duty cycle of the traction power inverter to minimize losses in the electric motor of the vehicle while providing the accessory bus voltage.

9. The method of claim 1, wherein enabling the electric motor and the traction power inverter of the vehicle to operate as the boost converter comprises controlling a set of switches to cause electric power to flow through the electric motor and the traction power inverter before flowing into an accessory of the vehicle.

10. A vehicle comprising:
   a traction power inverter;
   an electric motor a first switch (SC1) configured to connect a first terminal of a charging station to a positive bus of a rechargeable energy storage system;
   a second switch (SC2) configured to connected a second terminal of the charging station to a negative bus of the rechargeable energy storage system;
   a third switch (S1) connecting the positive bus of the rechargeable energy storage system to a positive distribution bus;
   a fourth switch (S2) connecting the negative bus of the rechargeable energy storage system to a negative distribution bus;
   a fifth switch (S3) connecting the positive rechargeable energy storage system bus to one of the electric motor and a single phase of the electric motor such that when the first switch and the fifth switch are closed power is delivered directly from the charging station to the one of the electric motor and the single phase of the electric motor through the first switch and the fifth switch; and
   a controller to:
   determine whether a charging station for charging a battery of a vehicle is operating in a first high voltage mode or a second high voltage mode; and
   responsive to determining that the charging station is operating in the first high voltage mode:
   enable an electric motor and a traction power inverter of the vehicle to operate as a boost converter to boost an accessory bus voltage of the vehicle while charging in the first high voltage mode; and
   charge the battery of the vehicle by supplying electric power, at a first high voltage, from the charging station to the battery.

11. The vehicle of claim 10, the controller further to, responsive to determining that the charging station is operating in the second high voltage mode:
   disable the electric motor and the traction power inverter of the vehicle to prevent the boost while charging in the second high voltage mode; and
   charge the battery of the vehicle by supplying electric power, at a second high voltage, from the charging station to the battery.

12. The vehicle of claim 11, wherein the first high voltage is substantially 400 volts and wherein the second high voltage is substantially 800 volts.

13. The vehicle of claim 11, wherein the accessory bus voltage is substantially 800 volts and wherein the first high voltage is substantially 400 volts.

14. The vehicle of claim 11, wherein disabling the electric motor and the traction power inverter of the vehicle to prevent the boost comprises controlling a set of switches to cause electric power to flow through an accessory of the vehicle before flowing into the traction power inverter and the electric motor.

15. The vehicle of claim 10, wherein the accessory bus voltage is boosted to substantially double the first high voltage.

16. The vehicle of claim 10, wherein a switching frequency for the traction power inverter is set to avoid resonant frequencies of an input of an accessory of the vehicle and of an input of the traction power inverter.

17. The vehicle of claim 10, the controller further to control a pulse width modulation frequency and a duty cycle of the traction power inverter to minimize losses in the electric motor of the vehicle while providing the accessory bus voltage.

18. The vehicle of claim 10, wherein enabling the electric motor and the traction power inverter of the vehicle to operate as the boost converter comprises controlling a set of switches to cause electric power to flow through the electric motor and the traction power inverter before flowing into an accessory of the vehicle.

19. A system comprising:
   a memory comprising computer readable instructions; and
   a processing device for executing the computer readable instructions, the computer readable instructions controlling the processing device to perform operations comprising:
   determining whether a charging station for charging a battery of a vehicle is operating in a first high voltage mode or a second high voltage mode; and
   responsive to determining that the charging station is operating in the first high voltage mode:
   enabling an electric motor and a traction power inverter of the vehicle to operate as a boost converter to boost an accessory bus voltage of the vehicle while charging in the first high voltage mode; and
   charging the battery of the vehicle by supplying electric power, at a first high voltage, from the charging station to the battery; and
   wherein the vehicle includes a traction power inverter;

an electric motor a first switch (SC1) configured to connect a first terminal of a charging station to a positive bus of a rechargeable energy storage system;

a second switch (SC2) configured to connected a second terminal of the charging station to a negative bus of the rechargeable energy storage system;

a third switch (S1) connecting the positive bus of the rechargeable energy storage system to a positive distribution bus;

a fourth switch (S2) connecting the negative bus of the rechargeable energy storage system to a negative distribution bus;

a fifth switch (S3) connecting the positive rechargeable energy storage system bus to one of the electric motor and a single phase of the electric motor such that when the first switch and the fifth switch are closed power is delivered directly from the charging station to the one of the electric motor and the single phase of the electric motor through the first switch and the fifth switch.

20. The system of claim 19, the instructions further causing the processing device to perform operations comprising, responsive to determining that the charging station is operating in the second high voltage mode:

disabling the electric motor and the traction power inverter of the vehicle to prevent the boost while charging in the second high voltage mode; and charging the battery of the vehicle by supplying electric power, at a second high voltage, from the charging station to the battery.

* * * * *